(12) United States Patent
do Amaral Assy et al.

(10) Patent No.: US 11,774,240 B2
(45) Date of Patent: Oct. 3, 2023

(54) SENSING SYSTEMS FOR AGRICULTURAL IMPLEMENTS AND RELATED METHODS

(71) Applicant: Jose Roberto do Amaral Assy, Caldas Novas (BR)

(72) Inventors: Jose Roberto do Amaral Assy, Caldas Novas (BR); Alexandre Leite Rosa, Sao Paulo (BR); Andre Nogueira de Sa, Bela Vista (BR); Douglas Candido Cavalcante, Tatuape (BR)

(73) Assignee: Jose Roberto Do Amaral Assy, Caldas Novas (BR)

( * ) Notice: Subject to any disclaimer, the term of this patent is extended or adjusted under 35 U.S.C. 154(b) by 0 days.

(21) Appl. No.: 17/684,006

(22) Filed: Mar. 1, 2022

(65) Prior Publication Data
US 2022/0187066 A1 Jun. 16, 2022

Related U.S. Application Data

(62) Division of application No. 16/221,326, filed on Dec. 14, 2018, now Pat. No. 11,287,255.

(51) Int. Cl.
| | |
|---|---|
| *A01C 5/06* | (2006.01) |
| *G01B 21/22* | (2006.01) |
| *A01C 7/10* | (2006.01) |
| *G01C 9/00* | (2006.01) |
| *G08B 21/18* | (2006.01) |
| *A01C 7/04* | (2006.01) |
| *G01H 1/00* | (2006.01) |

(52) U.S. Cl.
CPC ............ *G01B 21/22* (2013.01); *A01C 7/102* (2013.01); *G01C 9/00* (2013.01); *G08B 21/182* (2013.01); *A01C 5/064* (2013.01); *A01C 5/068* (2013.01); *A01C 7/04* (2013.01); *G01H 1/003* (2013.01)

(58) Field of Classification Search
CPC ............ A01C 5/064; A01C 5/068; A01C 7/04
See application file for complete search history.

(56) References Cited

U.S. PATENT DOCUMENTS

| | | | |
|---|---|---|---|
| 4,846,283 | A | 7/1989 | Batcheller |
| 5,884,407 | A | 3/1999 | Braun |
| 6,434,462 | B1 | 8/2002 | Bevly et al. |

(Continued)

FOREIGN PATENT DOCUMENTS

| | | |
|---|---|---|
| EP | 0 476 266 A1 | 3/1992 |
| EP | 2 322 026 A1 | 5/2011 |
| WO | 2019/113667 A1 | 6/2019 |

OTHER PUBLICATIONS

Non-Final Office Action received for U.S. Appl. No. 16/221,326 dated Aug. 27, 2021, 25 pages.

(Continued)

*Primary Examiner* — Jamie L McGowan
(74) *Attorney, Agent, or Firm* — Greenberg Traurig, LLP

(57) ABSTRACT

Sensing systems for agricultural equipment and related methods may be configured for detecting the operating state of rotating elements in agricultural implements. The sensing systems for an agricultural implement may include a rotating element and a monitoring center equipped with an alert mechanism. The sensing systems may include an inertial sensor, a microprocessor, a communication element, and a power supply. The sensing system may be a single element fixed directly to the rotating element.

6 Claims, 6 Drawing Sheets

(56) References Cited

U.S. PATENT DOCUMENTS

| | | |
|---|---|---|
| 6,749,035 B2 | 6/2004 | Bundy |
| 7,400,957 B2 | 7/2008 | Hofer et al. |
| 7,904,226 B2 | 3/2011 | Dix |
| 7,975,629 B1 | 7/2011 | Martin |
| 8,326,500 B2 | 12/2012 | Mariman et al. |
| 8,408,149 B2 | 4/2013 | Rylander |
| 9,002,566 B2 * | 4/2015 | McClure ............... G05D 1/0278 701/28 |
| 10,255,670 B1 | 4/2019 | Wu et al. |
| 2004/0206282 A1 | 10/2004 | Sandoval et al. |
| 2011/0113996 A1 | 5/2011 | Mariman et al. |
| 2011/0184551 A1 | 7/2011 | Kowalchuk |
| 2012/0291680 A1 | 11/2012 | Rylander |
| 2014/0196919 A1 | 7/2014 | Kowalchuk |
| 2016/0057921 A1 * | 3/2016 | Pickett ................ A01B 69/008 701/41 |
| 2016/0150721 A1 | 6/2016 | Henry et al. |
| 2017/0094894 A1 | 4/2017 | Heim et al. |
| 2018/0202804 A1 * | 7/2018 | Dumble ................ G01B 17/00 |
| 2019/0104675 A1 | 4/2019 | Shinkai |
| 2019/0150357 A1 | 5/2019 | Wu et al. |
| 2019/0186911 A1 | 6/2019 | do Amaral Assy et al. |
| 2020/0107488 A1 | 4/2020 | Schoeny et al. |
| 2021/0251128 A1 | 8/2021 | Rupp et al. |

OTHER PUBLICATIONS

Notice of Allowance received for U.S. Appl. No. 16/221,326 dated Nov. 29, 2021, 11 pages.

International Search Report and Written Opinion received for PCT Application Serial No. PCT/BR2018/050460 dated Mar. 28, 2019, 25 pages. (Including English Translation).

International Preliminary Report on Patentability received for PCT Application Serial No. PCT/BR2018/050460 dated Jun. 25, 2020, 9 pages.

* cited by examiner

SENSING SYSTEMS FOR AGRICULTURAL IMPLEMENTS AND RELATED METHODS

CROSS-REFERENCE TO RELATED APPLICATION

This application is a divisional of U.S. patent application Ser. No. 16/221,326, filed 14 Dec. 2018, which claims priority to Brazilian patent application number BR 102017027139-0 of Jose Roberto do Amaral Assy, filed 15 Dec. 2017, the entire disclosure of each of which is incorporated herein by reference.

FIELD

This disclosure generally relates the sensing systems for agricultural equipment. In some examples, the disclosure relates to systems and methods for detecting the operating state of rotating elements in agricultural implements.

BACKGROUND

Conventional agricultural implements for planting, generally referred to as planters or seed planters, are used mainly for large-scale planting on large grounds. In this way, a systematic error such as improper adjustment of the equipment, locking of a rotating element, or even the breaking of some element can cause poor planting in large areas of a field and, therefore, can bring enormous damages to the farmer.

As for the operation of agricultural implements, one of the most common problems is the locking of the rotational movement of wheels, discs, and rotating elements in general, a phenomenon also called "snagging." Snagging occurs mainly due to the entry of debris (straw, roots, grass, and dry clods) between two portions with relative movement, so that the rotational movement of the rotating element in question is blocked.

Another less frequent problem is the breaking of movement transmission components to the rotating elements due to mechanical failures. The direct consequences of these events may include the dragging of planting inputs, alteration of distance between seeds, reduction of seed planting depth, and absence of soil pressure on the planting inputs. These consequences can cause, among other problems, the appearance of fungi and problematic germination, besides the reduction of the lifetime of the machine in operation.

There are known systems to avoid such damages that aid in the identification of events that may be detrimental to the smooth progress of the planting process. A document disclosing a system for this purpose is European Patent No. EP0476266, which describes a monitoring device for seeding that has at least one sensor arranged on a drive wheel and an acoustic or visual alert method.

The EP0476266 document discloses a monitoring system intended to stop operating while the farm equipment is stationary and starts working again only under field operating conditions, where the seeds are effectively introduced into the soil. The aim of this system is not to warn about a wheel locking incident, but to interrupt the planting operation if the wheel stops turning, even with the agricultural implement still in motion.

Also known is U.S. Patent Application Publication No. 2004/0206282, which discloses a system for distributing a precise amount of inputs (e.g., seeds, fertilizer, etc.) as a function of the operational speed of the agricultural implement. The implement speed is detected using sensors and a signal is sent to adjust the quantity of inputs to be delivered as defined by the operator. Although this publication presents a solution to assist in the adequate delivery of inputs, in a wheel-locking event with the implement still at operational speed, the delivery of the inputs would be reduced or terminated improperly without alerting the operator.

Another document that discloses the use of sensors in agricultural equipment is U.S. Pat. No. 8,326,500. This document discloses the use of a rotation sensor to detect and alert an operator when a wheel has stopped rotating while the agricultural implement is still in motion.

The system disclosed in U.S. Pat. No. 8,326,500 uses a single sensor to monitor two wheels of the agricultural implement at the same time and alerts the operator only when the implement is in motion.

The sensors conventionally used to detect wheel rotation include magnetic sensors, inductive sensors, proximity sensors, optical sensors, and speed sensors, the latter being normally used in the wheel bearings.

All of the aforementioned conventional sensors have in common the necessity of having two parts with relative movement between each other, so that one of the parts functions as a reference and the other as a detector. For example, conventional magnetic and inductive sensors use magnets and metals attached to the wheels to detect the number of times that the components pass each other in a certain period. Additionally, the optical and proximity sensors use similar openings or protrusions in an analogous manner.

In general, conventional systems often use wires and cables for sensor feeding and data transmission, which makes fabrication, installation, and maintenance costly, time-consuming, and often dependent on skilled labor.

Conventional systems, especially those equipped with sensors having their own reference elements, have certain drawbacks and limitations related to the installation, maintenance, and costs.

SUMMARY

Embodiments of the present disclosure may provide a sensing system used in an agricultural implement, which may be capable of eliminating, or at least reducing, the limitations of conventional technologies.

Furthermore, embodiments of the present disclosure may provide a sensing system, particularly for use in agricultural equipment, that may be capable of identifying the rotation and/or tilt of a rotating element. The disclosed systems may additionally or alternatively identify when the agricultural implement excessively vibrates.

Embodiments of the present disclosure may also provide an easy-to-install sensing system without the use of wire and cables for power and communication with a central unit.

In order to overcome at least some of the drawbacks of conventional systems, some embodiments of the present disclosure include a sensing system for agricultural equipment, in which the agricultural implement may include a rotating element and a monitoring center equipped with an alert mechanism. The sensing system may include: an inertial sensor; a microprocessor; a communication element; and a power supply. The sensing system may be a single element fixed directly to the rotating element.

In accordance with additional or alternative embodiments of the disclosure, the following features, either alone or in technically possible combinations, also may be present: the rotating element may be one among the group of: a contact wheel, a cutting disc, a depth wheel, a closing wheel, a cleansing wheel, or a hinge of the agricultural implement; the communication element may be a wireless communication element; and/or the power supply may include at least one of a battery, a cable, or an energy collector/generator.

Embodiments of the present disclosure also include a method of rotation sensing applied in an agricultural implement including a rotating element. The method may include: (a) performing a first reading of inertial values of orthogonal axes of a sensor reference system and defining a first resulting vector; (b) performing a second reading of the inertial values of the orthogonal axes of a sensor reference system and defining a second resulting vector; (c) calculating an angular variation between the first and second resulting vectors; (d) determining whether there is an angular variation between the first and second resulting vectors and, if there is no angular variation, sending an alert signal to a monitoring center; and (e) repeating the foregoing steps sequentially starting from step (a) if there is an angular variation.

The present disclosure also includes, in some embodiments, a method of tilt sensing applied in an agricultural implement, wherein the agricultural implement includes a rotating element, a reference element, and a monitoring center. The tilt sensing method may include the steps of: (a) performing a first reading of the inertial values of orthogonal axes of a reference system of a first inertial sensor fixed on the rotating element and defining a first resulting vector; (b) performing a second reading of the inertial values of the orthogonal axes of the reference system of a second inertial sensor fixed on the reference element and defining a second resulting vector; (c) calculating an angular variation between the first and second resulting vectors; (d) determining a relative angle between the rotating element and the reference element; and (e) determining a relative orientation of the rotating element relative to the reference element.

The disclosed tilt sensing method may also include the following additional or alternative embodiments, provided either alone or in combination: the rotating element may be one of a contact wheel, a cutting disc, a depth wheel, a closing wheel, or a cleansing wheel; the reference element may be one of a chassis, a contact wheel, or a monitoring center; the reference element may be a second rotating element and when the relative angle between the first rotating element and the second rotating element is different from zero, the reference element may execute a step of alerting the operator of the agricultural implement; and/or the reference element may be a chassis and defining the relative angle between the rotating element and the reference element may include defining the tilt of the rotating element with respect to the agricultural implement.

Further, the present disclosure includes, according to some embodiments, a vibration sensing method applied in an agricultural implement. The vibration sensing method may include: (a) performing readings for a predetermined period of inertial values of the orthogonal axes of a reference system of an inertial sensor fixed to an element of an agricultural implement; (b) calculating the average of the readings in one of the axes and defining an operational limit for the readings; (c) determining whether there is a variation in the readings greater than the defined operational limit; and (d) sending an alert to an operator when there is a variation greater than the defined operational limit.

BRIEF DESCRIPTION OF THE DRAWINGS

The objects, advantages, and technical and functional improvements of the disclosed concepts will be better understood from reading the descriptions of their particular accomplishments, made below with relation to the attached figures, which illustrate modes of example, non-limiting embodiments, wherein.

DETAILED DESCRIPTION OF EXAMPLE EMBODIMENTS

The concepts of the present disclosure will now be described with respect to certain particular embodiments, referring to the attached figures. In the following figures and description, similar parts are marked with equal reference numbers. The figures are not necessarily drawn to scale, i.e., certain features of the figures may be shown with exaggeration of scale or in some schematic way. Additionally, details of conventional elements may not be shown in order to illustrate this description more clearly and concisely. Embodiments of the present disclosure are susceptible to implementation in different ways. Specific embodiments are described in detail and shown in the figures, with the understanding that the description is to be regarded as an providing examples of the principles disclosed herein, and is not intended to limit the present disclosure only to what is illustrated and described herein. It should be recognized that the different teachings of the embodiments discussed below may be employed separately or in any suitable combination to produce the same or similar technical effects.

The present disclosure will be described below using a planting row unit as a non-limiting example of an agricultural implement 1.

Figure 1:
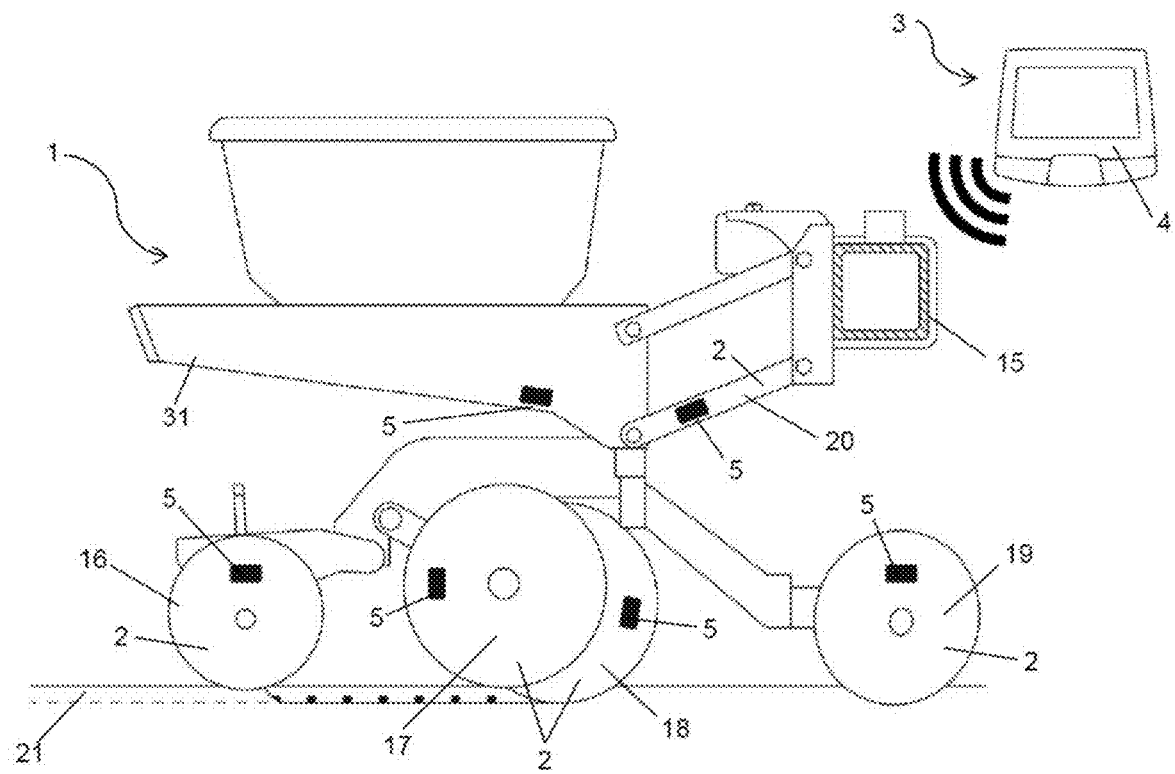
FIG. 1 shows a side view of an agricultural implement equipped with a sensing system according to an embodiment of the present disclosure.

The terms "rotating element" and "rotating elements" shall be interpreted as any element(s) that rotate(s) around a fixed axis, such as the rotating elements 2 illustrated in FIG. 1. From left to right in FIG. 1, the illustrated rotating elements include a closing wheel 16, a depth wheel 17, a cutting disc 18, a cleansing wheel 19 and, above the latter, a connecting hinge 20 for connecting to a chassis of the seed planter 15.

Also illustrated in FIG. 1 are sensing systems 5 fixed to the rotating elements 2 according to particular example embodiments of the disclosure and a monitoring center 3. Monitoring center 3 is normally arranged in the operator's cab (not shown) of the agricultural implement 1 and is equipped with an alert mechanism 4. The alert mechanism 4 may be any mechanism that may draw the operator's attention in the event of an alert, such as, for example, a beep-buzzer, a siren and/or other audible alarm, or a visual signal (e.g., an image or text on a display, which may be flashing or fixed on a display panel).

Figure 2:
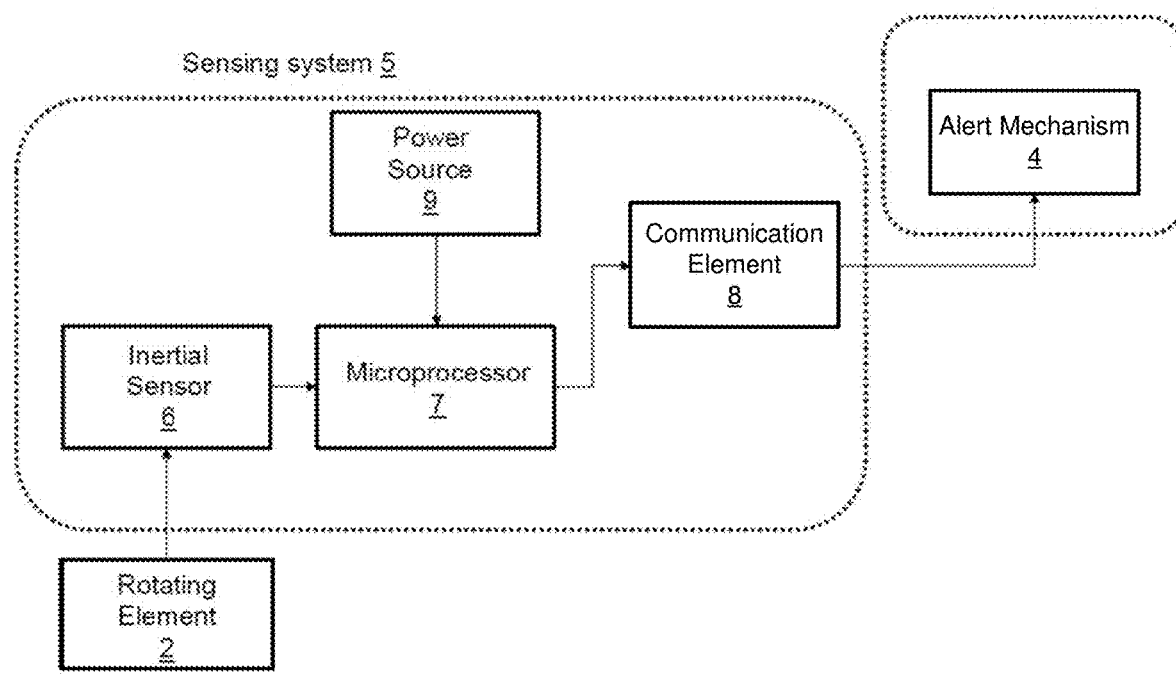
FIG. 2 shows a schematic representation of the sensing system related to the agricultural implement according to one embodiment of the present disclosure.

As shown in FIG. 2, the sensing systems 5, also referred to herein as "single elements" 5, may be fixed directly to the rotating elements 2 to be monitored. The sensing systems 5 may be configured for wirelessly communicating with a monitoring center 3. Each sensing system 5 may include an inertial sensor 6, a microprocessor 7, a communication element 8, and a power supply 9.

The power source 9 for energizing the sensing system 5 may be or include a battery that is internal to the single element 5, but may also be used, by way of additional example, with external batteries to the single element 5. In embodiments in which external batteries are used, the single element 5 may be connected to the external battery(ies) by cables or energy collectors/generators mounted on the sensor assembly. Energy collectors/generators are devices capable of absorbing energy such as, for example, the mechanical energy of the vibration of the agricultural implement 1 or solar energy from photovoltaic collectors.

Figure 3:
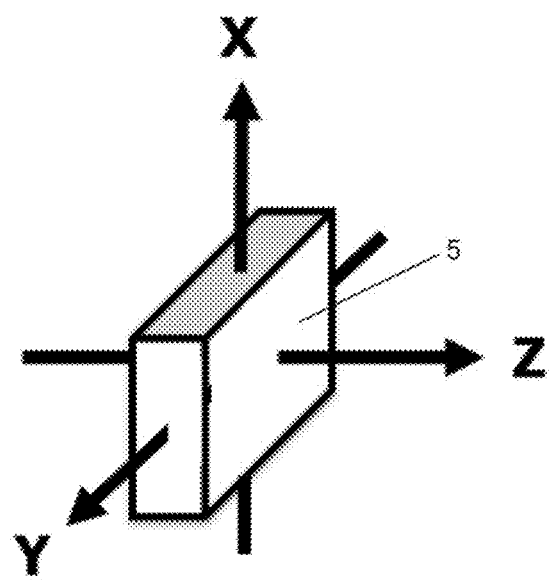
FIG. 3 shows a schematic perspective view of a single element of a sensing system illustrating a reference system of orthogonal axes according to an embodiment of the present disclosure.

In the accompanying figures, the single element of the sensing system 5 is represented by a parallelogram, so that all the inertial measurements performed consist of intensity values oriented along three orthogonal reference axes of the sensor, as shown in FIG. 3 as the x, y and z axes.

Figure 4:
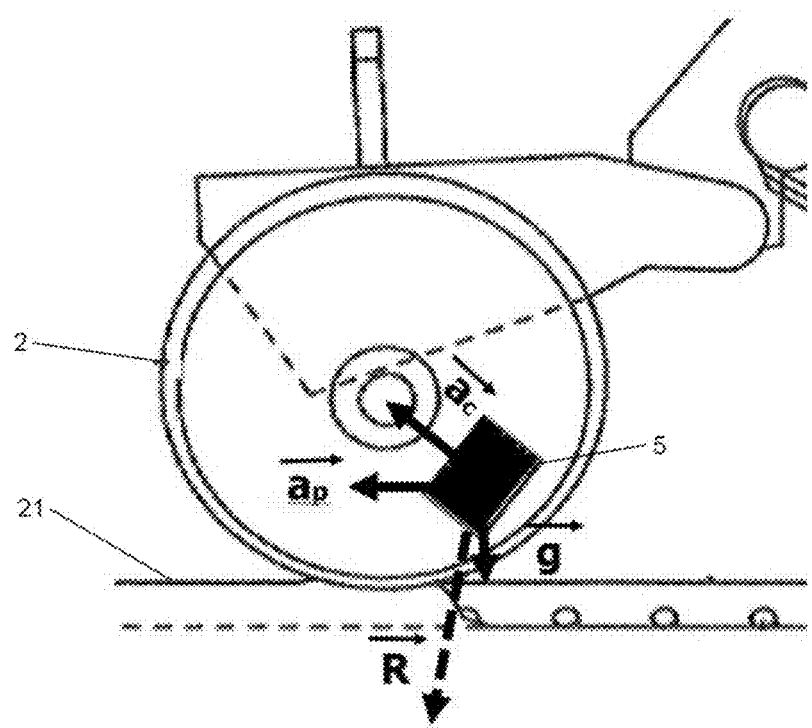
FIG. 4 shows a side view of a closing wheel with a sensing system according to an embodiment of the present disclosure.

In one example embodiment, as illustrated in FIG. 4, the sensing system 5 may be fixed to a rotating element 2 in contact with the ground 21, such as a closing wheel 16. FIG. 4 illustrates a dynamic working model, wherein: ac represents the centripetal acceleration of the wheel during the movement of the seed planter; ap represents the drag acceleration felt by the inertial sensor assembly 6 (see FIG. 2) due to accelerated movement of the seed planter; g represents gravitational acceleration; and R represents the resulting acceleration measured by an accelerometer of the sensing system 5.

Figure 5:
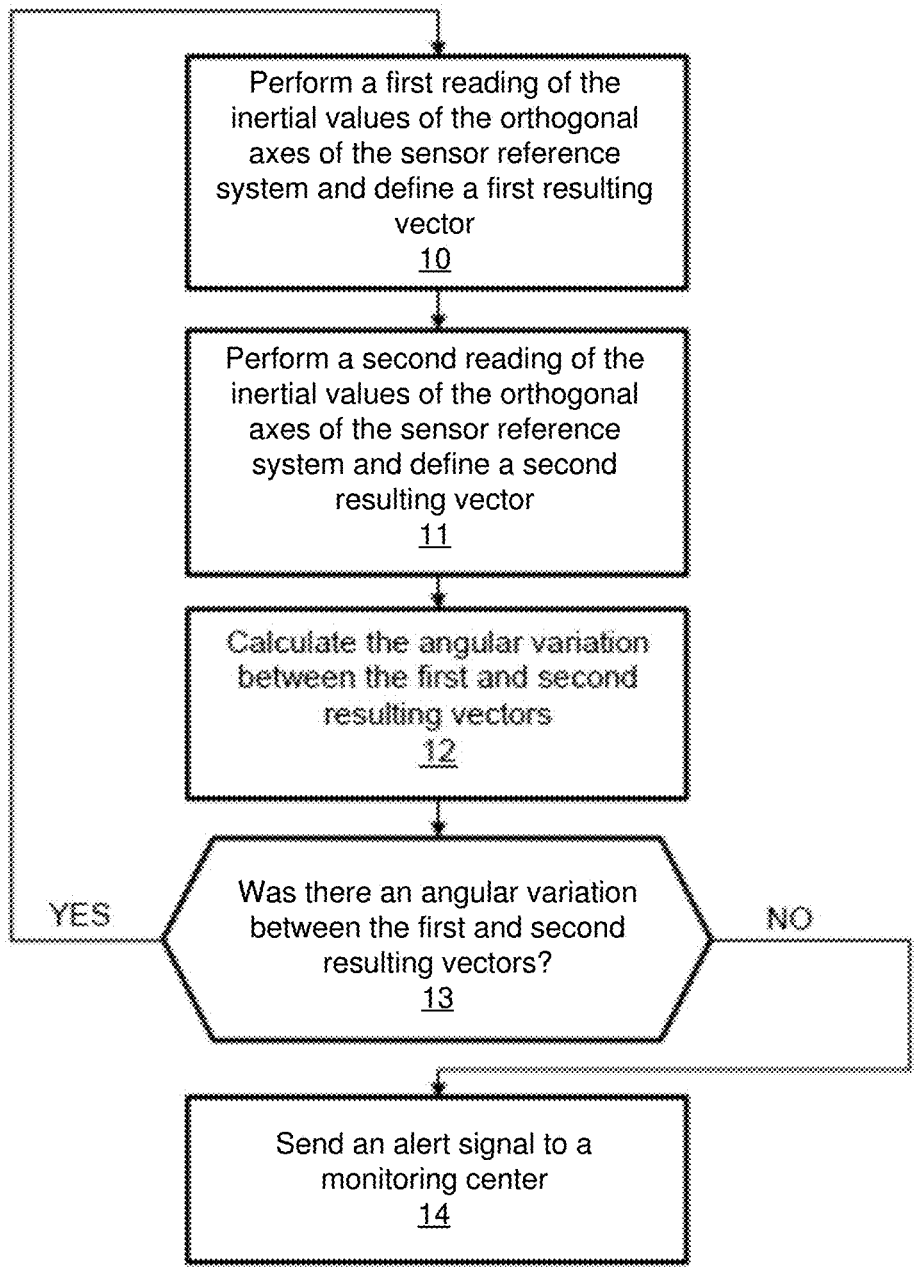
FIG. 5 shows a flow chart illustrating a method of rotation sensing according to an embodiment of the present disclosure.

Another embodiment of the disclosure, illustrated in FIG. 5, includes a method for detecting rotation of rotating elements is applied. In operation 10, the sensing system 5 performs a reading of acceleration values by providing a first resulting reference vector of an initial instant. Data representing the first resulting reference vector and the initial instant may then be transmitted to the microprocessor 7 (see FIG. 2) and stored. In operation 11, at a later time, a second measurement may be performed and a second resulting vector may be supplied to the microprocessor 7 for comparison with the first resulting vector. Hence, at operation 12, a relative angular variation calculation may be made. At operation 13, it may be evaluated whether there is any angular variation. If there is no angular variation, an alert signal may be sent (e.g., by radio frequency (RF)) to a monitoring center 3 located at the operator station of the agricultural implement 1, as illustrated at operation 14. If there is an angular variation, then first and second resulting vectors and a potential angular variation may be recalculated as illustrated at operations 10 through 12.

The inertial sensor 6 (FIG. 2) used in the sensing system 5 may be an inertial sensor 6 of an accelerometer type. In this case, the acceleration values may be composed mainly of the intensity of the gravitational acceleration. However, any other inertial sensor 6 that can perform the same or a similar function may be used, such as a gyroscope or magnetometer that may be capable of sensing the earth's magnetic field, since they may be able to generate orientation vectors based on an absolute, reference, gravitational, or electromagnetic parameter.

As described above, communication by the sensing system to the monitoring center 3 may be performed with radiofrequency waves. However, additional embodiments of the disclosure may be implemented in other ways, such as, for example, by infrared waves and/or in other ways (e.g., with the use of wires or cables).

Figure 6:
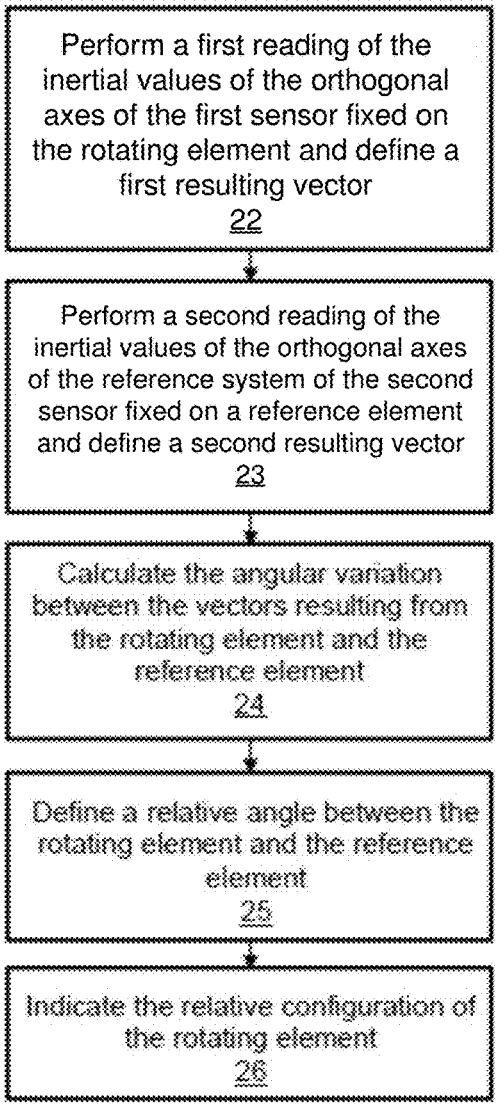
FIG. 6 shows a flowchart illustrating a method of tilt sensing according to an embodiment of the present disclosure.

In another embodiment, as illustrated in FIG. 6, the sensing system 5 may be used to detect the tilt of the rotating element 2 by position/orientation identification of the rotating element 2 with respect to a reference element 31, which may include a second sensing system 5 that may be positioned on the agricultural implement 1. As indicated at operation 22, the sensing system 5 fixed to the rotating element 2 may perform a first reading of the inertial values of the orthogonal axes of the reference system and defines a first resulting vector. At operation 23, the sensing system 5 fixed to a reference element 31 (FIG. 1) may perform a second reading of the inertial values of the orthogonal axes of the reference system and may define a second resulting vector. At operation 24, the angular variation between the vectors resulting from the rotating element 2 and the reference element 31 may then be calculated. At operation 25, the relative angle between the rotating element 2 and the reference element 31 may be defined. At operation 26, the relative configuration (e.g., orientation) of the rotating element 2 (e.g., relative to the reference element 31) may be indicated to the operator.

The method for determining the tilt may be based on the crossing/fusion of information of the two inertial elements that can be performed in the individual microprocessors 7 of the sensing systems 5 or in the monitoring center 3.

Figure 7:
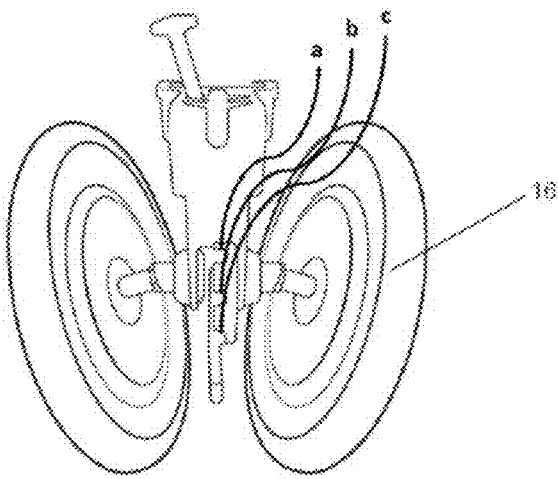
FIG. 7 shows a rear view of a set of closing wheels according to an embodiment of the present disclosure.

An example application of principles of the present disclosure may be made in closing wheels 16, as shown in FIG. 7. Closing wheels 16 generally have the function of ensuring the adequate housing of the planted inputs (e.g., seeds, fertilizer) for a quality germination. This is done by filling the groove (e.g., furrow) opened by the planting row unit with the soil that has been previously removed. The closing wheels 16 are often the last element positioned in the planting row unit, so that their angulation directs the soil to its narrowest portion, causing the closing and pressing of the groove with the inputs already planted.

The assembly of the elements of the closing wheels 16 also allows for some adjustments, such as the tilt of the central bar connected to the axles of the wheels, the pressure exerted by the wheels 16 on the ground 21 by a spring and, in some models, the relative angulation between the two wheels 16 can also be varied. These adjustments may made possible by the positioning of a lever between 3 different configurations (illustrated in FIG. 7 as a, b, and c, respectively), thus changing the relative angulation of the wheels 16 to the ground 21.

The method for identifying the tilt of the rotating element 2 may be particularly advantageous when the rotating element 2 is a critical-function element such as a closing wheel 16, so that an alert signal is sent to the operator as soon as the event of tilt variation is detected to avoid prolonged planting damage.

Figure 8:
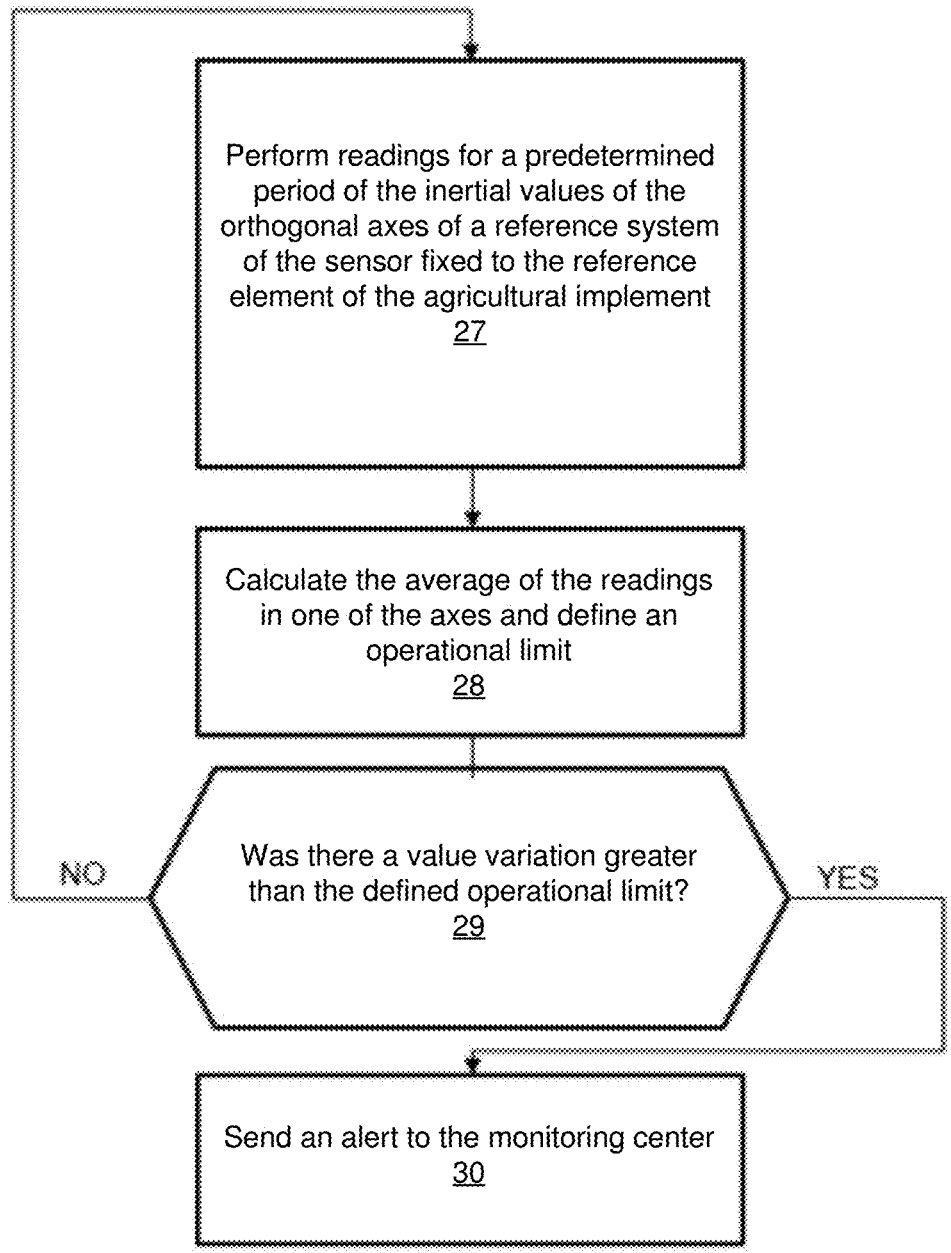
FIG. 8 shows a flowchart illustrating a method of vibration sensing according to an embodiment of the present disclosure.
Figure 9:
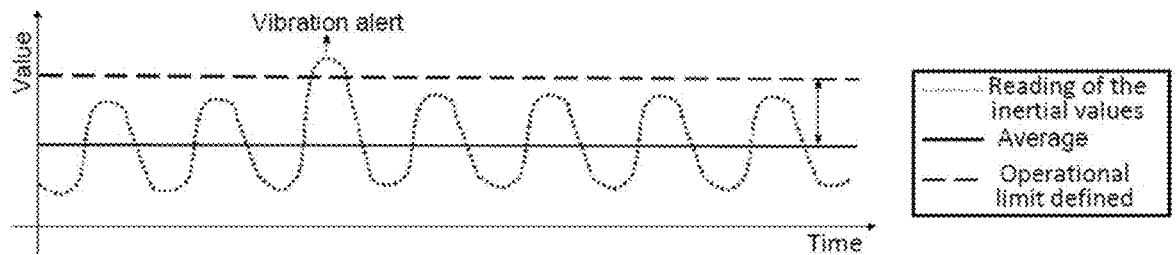
FIG. 9 shows a graph of signals obtained from the readings of the sensing system according to an embodiment of the present disclosure.
Figure 10:
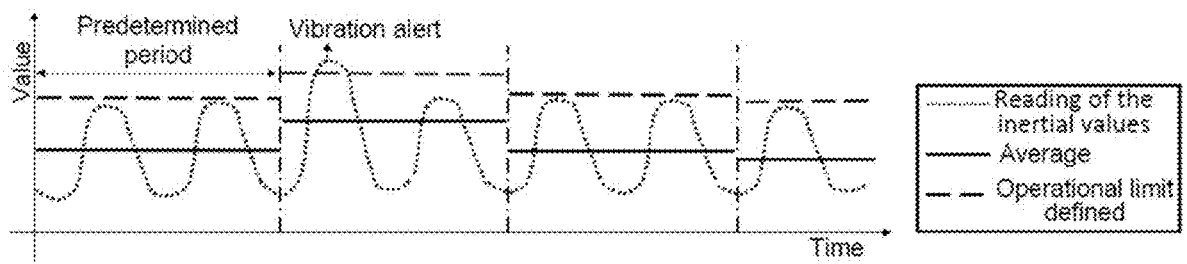
FIG. 10 shows a graph of signals obtained from the readings of the sensing system according to another embodiment of the present disclosure.

A third example method of the present disclosure, shown in FIG. 8, may involve detecting vibration levels of mechanical elements of the agricultural implement 1. To this end, the inertial sensor mounting assembly 6 previously described may be secured to the mechanical element. At operation 27, readings may be performed of the inertial quantities for a predetermined period of time. Then, an operational limit can be calculated and defined based on the average of the measurements of the period, as illustrated at operation 28. As illustrated at operation 29, it may be determined whether there was a value variation greater than a defined operational limit. As shown in operation 30, an alert may be sent to the operator via the monitoring center 3 of the agricultural implement 1 if the measurements subsequent to the calibration period exceed the established operational limit. For example, data representing vibrational measurements during a calibration period are shown in FIGS. 9 and 10. In FIG. 10, the intervals for average calculation are defined in smaller intervals than in FIG. 9.

While concepts of the disclosure have been specifically described with respect to particular embodiments, it should be understood that variations and modifications will be apparent to those skilled in the art and may be accomplished without departing from the present disclosure. Consequently, the scope of protection is not limited to the embodiments described, but is limited only by the attached claims, the scope of which must include all equivalents.

What is claimed is:

1. A method of rotation sensing applied in an agricultural implement, wherein the agricultural implement comprises a rotating element, the method comprising:
    performing a first reading of inertial values of orthogonal axes of a reference system of a sensor at a first time and defining a first resulting vector;
    performing a second reading of the inertial values of the orthogonal axes of the reference system of the sensor at a second time and defining a second resulting vector;
    calculating an angular variation between the first and second resulting vectors; and
    determining whether there is an angular variation between the first and second resulting vectors and, if there is an angular variation, repeating the foregoing steps and, if there is no angular variation, sending an alert signal to a monitoring center.

2. A method of tilt sensing for an agricultural implement, wherein the agricultural implement comprises a first rotating element, and a reference element comprising a second rotating element, the method comprising:
    performing a first reading of inertial values of the orthogonal axes of a reference system of a first inertial sensor fixed on the first rotating element and defining a first resulting vector;
    performing a second reading of the inertial values of the orthogonal axes of a reference system of a second inertial sensor fixed on the second rotating element and defining a second resulting vector;
    calculating an angular variation between the first and second resulting vectors;
    determining a relative angle between the first rotating element and the second rotating element;
    determining a relative orientation of the first rotating element relative to the second rotating element; and
    when the relative orientation between the first rotating element and the second rotating element is different from zero, alerting an operator of the agricultural implement of a tilt.

3. The method of claim 2, wherein the first rotating element is selected from the group consisting of: a contact wheel, a cutting disc, a depth wheel, a closing wheel, or a cleansing wheel.

4. The method of claim 2, wherein the reference element is selected from the group consisting of: a chassis, a contact wheel, or a monitoring center.

5. The method of claim 4, wherein the reference element is the chassis and wherein defining the relative angle between the first rotating element and the reference element comprises defining the tilt of the first rotating element with respect to the agricultural implement.

6. A method of rotation sensing applied in an agricultural implement, wherein the agricultural implement comprises a rotating element selected from the group consisting of: a contact wheel, a cutting disc, a depth wheel, a closing wheel, or a cleansing wheel, the method comprising:
    performing a first reading of inertial values of orthogonal axes of a sensor reference system and defining a first resulting vector;
    performing a second reading of the inertial values of the orthogonal axes of the sensor reference system and defining a second resulting vector;
    calculating an angular variation between the first and second resulting vectors; and
    determining whether there is an angular variation between the first and second resulting vectors and, if there is an angular variation, repeating the foregoing steps and, if there is no angular variation, sending an alert signal to a monitoring center.

* * * * *